United States Patent [19]

Tran

[11] Patent Number: 5,301,330
[45] Date of Patent: Apr. 5, 1994

[54] CONTENTION HANDLING APPARATUS FOR GENERATING USER BUSY SIGNAL BY LOGICALLY SUMMING WAIT OUTPUT OF NEXT HIGHER PRIORITY USER AND ACCESS REQUESTS OF HIGHER PRIORITY USERS

[75] Inventor: Thang M. Tran, Austin, Tex.

[73] Assignee: Advanced Micro Devices, Inc., Sunnyvale, Calif.

[21] Appl. No.: 596,549

[22] Filed: Oct. 12, 1990

[51] Int. Cl.$^5$ ........................ G06F 13/14; G06F 13/00
[52] U.S. Cl. ........................... 395/725; 395/325;
    395/800; 364/242.6; 364/242.7; 364/DIG. 1;
    364/937.01
[58] Field of Search ............... 395/725, 800, 325, 775;
    364/200

[56] References Cited

U.S. PATENT DOCUMENTS

| | | | |
|---|---|---|---|
| 3,334,191 | 8/1967 | Arseneau et al. | |
| 4,015,242 | 3/1977 | Anceau et al. | 340/172.5 |
| 4,047,161 | 9/1977 | Davis | 364/200 |
| 4,073,005 | 2/1978 | Parkin | 364/200 |
| 4,103,330 | 7/1978 | Thacker | 364/200 |
| 4,177,513 | 12/1979 | Hoffman et al. | 364/200 |
| 4,394,727 | 6/1983 | Hoffman et al. | 364/200 |
| 4,453,214 | 6/1984 | Adcock | 364/200 |
| 4,488,218 | 12/1984 | Grimes | 364/200 |
| 4,499,538 | 2/1985 | Finger et al. | 364/200 |
| 4,620,278 | 10/1986 | Ellsworth et al. | 395/325 |
| 4,672,536 | 6/1987 | Giroir et al. | 364/200 |
| 4,908,749 | 3/1990 | Marshall et al. | 395/325 |
| 5,019,966 | 5/1991 | Saito et al. | 395/775 |

Primary Examiner—Thomas C. Lee
Assistant Examiner—Paul Harrity
Attorney, Agent, or Firm—Foley & Lardner

[57] ABSTRACT

Contention handling apparatus which receives access request signals from a number of users and processes these requests to allow controlled access to a shared resource. The contention handling apparatus includes a number of access blocks, with one of the access blocks being associated with each user. A busy line of each of the access blocks is connected to receive a busy signal; the busy signal being an access request signal from a higher priority user, thereby indicating that the shared resource is unavailable. Each access block receiving a busy signal, latches the corresponding access request signal until the busy signal is deasserted. If the busy signal and the access request signal occur at the same time, the corresponding access block generates a wait output signal. The logical sum of the wait output of an access block associated with a next higher priority user and the access request signals of all the higher priority users serves as the busy signal for one of the access blocks.

6 Claims, 2 Drawing Sheets

CONTENTION HANDLING APPARATUS FOR GENERATING USER BUSY SIGNAL BY LOGICALLY SUMMING WAIT OUTPUT OF NEXT HIGHER PRIORITY USER AND ACCESS REQUESTS OF HIGHER PRIORITY USERS

BACKGROUND OF THE INVENTION

This invention relates to systems having shared resources which are accessed by multiple control blocks, and particularly to systems for resolving contentions between the multiple resources.

DISCUSSION OF RELATED ART

It is quite common in data processing systems to provide a single resource, such as a main memory, which is shared by a plurality of processors. Each processor must individually access the resource to obtain data, instructions, etc. required for carrying out its programmed tasks. As is often the case, more than one of the processors, or control blocks, will attempt to access the shared resource at the same time. It is therefore necessary to provide a system to resolve contentions of this nature.

Also, in 2-phase clock system, many control blocks (with a state machine) can operate concurrently. A priority system for accessing shared resources (i.e. a data bus, a tag array, a data array, etc.) may be carried out by sending BUSY signals between the control blocks, causing the control block to enter a wait state. This technique, however, is cumbersome because a control block may be able to carry out additional functions or access other shared resources, if it is not required to enter a wait state. Thus, a better system of handling contentions between competing control blocks is required.

SUMMARY OF THE PRESENT INVENTION

An object of the present invention is to provide a system which receives access requests from a number of control blocks and processes these requests to allow controlled access to a shared resource by the control blocks.

Another object of the present invention is to provide a contention handling circuit which can provide a predetermined priority to the requesting control blocks.

In accordance with the above and other objects, the present invention is an apparatus comprising a data processing resource to be shared, a plurality of users for sharing the resource, and, associated with each user, a contention handling circuit. The contention handling circuit comprises an input line for receiving an access request signal from the associated user, an output gate for transmitting the access request signal to the resource, an input line for receiving a busy signal indicating that access to the resource is unavailable, circuitry for disabling the output gate in response to the busy signal, and circuitry for latching in the request signal until the busy signal is deasserted.

The contention handling circuit may produce a wait output state when the busy signal and the access request signal occur at the same time.

The circuitry for latching may comprise feedback for feeding the wait output back to the input line.

BRIEF DESCRIPTION OF THE DRAWINGS

The foregoing and other objects of the invention will become more readily apparent as the invention becomes more fully understood based on the detailed description below, reference being had to the accompanying drawings in which like reference numerals represent like parts and in which.

DETAILED DESCRIPTION OF THE PREFERRED EMBODIMENTS

Figure 1:
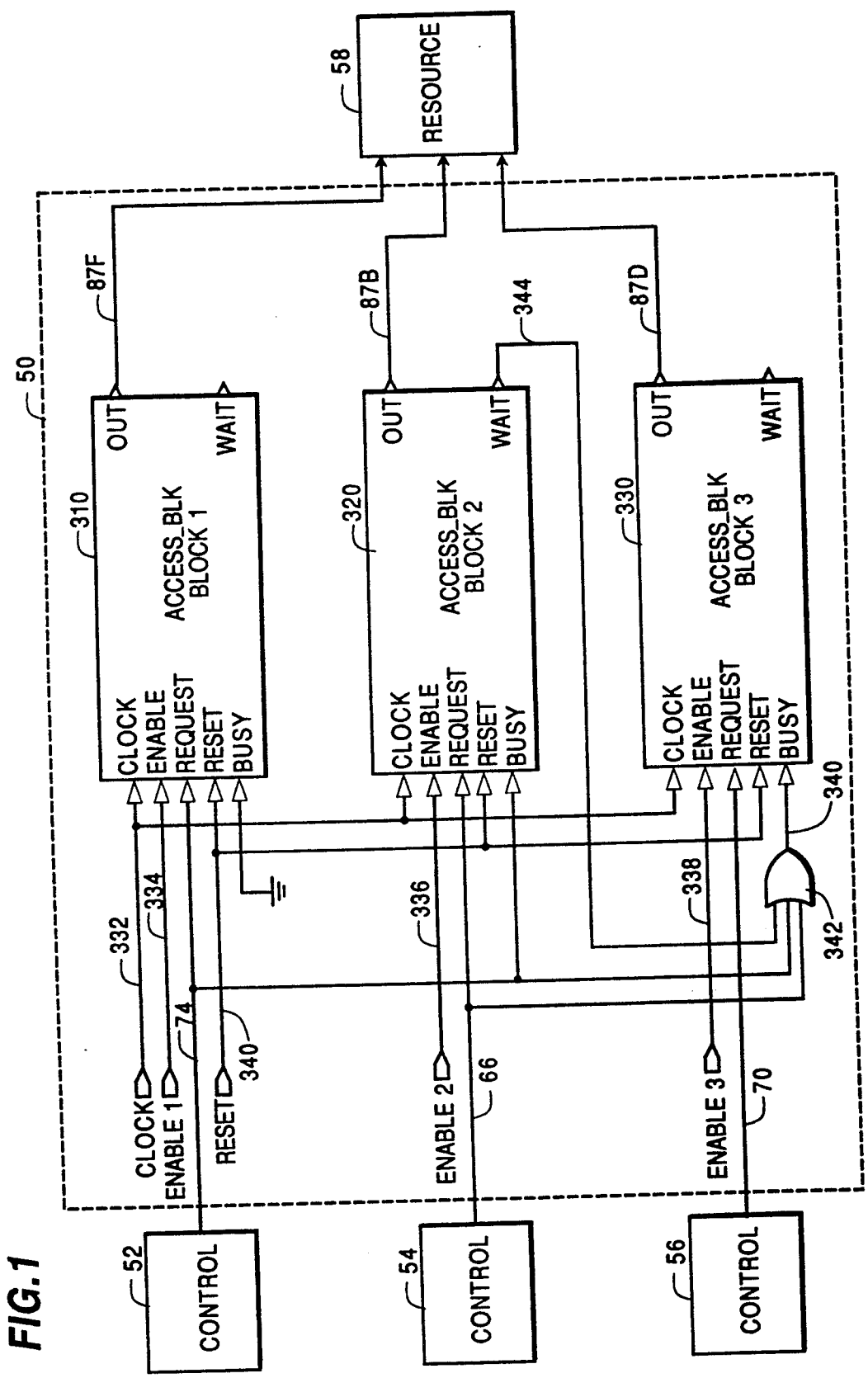
FIG. 1 is a block diagram showing the present invention.

FIG. 1 is a block diagram showing the connection of resource contention circuit 50 of the present invention in a system having multiple controls 52, 54, 56, such as microprocessors, and a shared resource 58, such as a main memory. Resource contention circuit 50 receives access requests on lines 74, 66 and 70, respectively, from controls 52, 54 and 56, and passes these requests to resource 58 on lines 87F, 87B and 87D according to a predetermined priority. It will be understood that additional connections exist between the controls 52, 54 and 56, and resource 58. For example, there may be a common memory bus and a common address bus connecting these units, as is conventional in a data processing system.

As shown in FIG. 1, contention circuit 50 contains three access blocks 310, 320 and 330. The outputs of the access blocks comprise access request lines 87F, 87B, and 87D. Each block also has a clock input which accepts clock pulses on line 332 for synchronization. The clock signal may be a bi-phase signal which is common to the control blocks 52, 54 and 56, as well as the resource block 58 for synchronization.

Each block 310, 320 and 330 also has an enable input to accept an enable signal on a respective enable line 334, 336 or 338. The enable signals may be generated by the respective control blocks 52, 54 and 56, to indicate an operational state of the respective block, or in any other manner which would be apparent to one skilled in the art.

Each block 310, 320 and 330 also has a reset input to accept a reset signal on line 340. The reset signal may be generated by any of the control blocks 52, 54 or 56, or in any other manner which would be apparent to one skilled in the art.

Each block also has a request input to receive a respective access re signal. Block 310 receives an access request on line 74 from control block 52, block 320 receives an access request on line 66 from control block 54, and block 330 receives an access request on line 70 from control block 56.

Each block 310, 320 and 330 also has a BUSY input which receives a high signal to prevent that block from producing an output.

It will be seen that the BUSY input to block 310 is grounded so that block 310 is always enabled to produce an output on line 87F whenever it receives a request on line 74. The BUSY input of block 320 receives as its input request line 74 so that block 320 is prevented from producing an output on line 87B whenever a request is being made to block 310.

Each block also has a wait output which is asserted whenever that block has received a request on its request input and a high signal on its BUSY input and has not yet serviced that request. The BUSY input of block 330 receives the output on line 340 from an OR gate 342. The input to the OR gate comprises lines 74 and 66 as well as line 344 from the wait output of block 320. Accordingly, the BUSY input of block 330 receives a high signal whenever a request is being made to block 310, a request is being made to block 320, or block 320 is in a wait state.

As will be understood, the connections discussed above produce a priority response in which access requests on line 74 are processed with highest priority, requests on line 66 are processed with second highest priority, and requests on line 70 have lowest priority.

Figure 2:
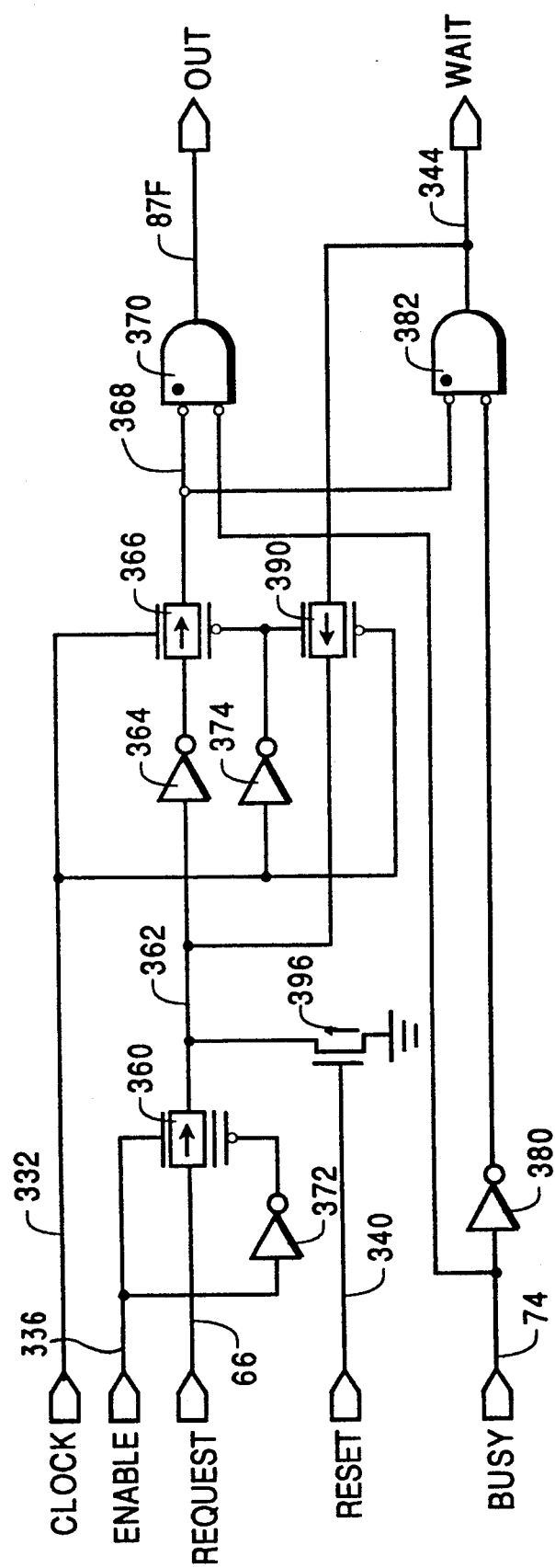
FIG. 2 is a detailed schematic of one of the access blocks of FIG. 1.

FIG. 2 shows a circuit which is duplicated in each of the blocks 310, 320 and 330. For ease of reference, it will be assumed that FIG. 2 is the circuit of block 320, it being understood that the other blocks have the same circuits.

As seen in FIG. 2, request line 66 is input to a CMOS switch 360 whose output is passed along line 362 to inverter 364. The output of inverter 364 is received at the output of a second CMOS switch 366 whose output is passed along line 368 to an inverted input of a AND gate 370.

One gate of switch 360 is connected to line 336 and the complementary gate is connected through inverter 372 to line 336 so that a high signal line on line 336 opens switch 360 to pass a request signal on line 66 to inverter 364 which passes the signal to switch 366. One gate of switch 366 is connected to clock line 332 while a complementary input is connected through inverter 374 to clock line 332. The clock pulse is bi-phase so that switch 366 is opened on positive going half cycles to pass the output of inverter 364 to line 368.

The other input of AND gate 370 is the inverted signal on line 74. Therefore, it can be seen that if line 74 is low, request signals on line 66 are passed directly to line 87F during positive clock pulses when the enable signal is asserted.

When the BUSY input is high, the signal on line 74 is inverted by inverter 380 and passed to an inverting input of AND gate 382. The other input of gate 382 is the inverted signal on line 368. The output of AND gate 382 is wait line 344. This line is passed to the input of a CMOS switch 390 whose output is connected to the input of inverter 364. One gate of switch 390 is connected to the output of inverter 374 and the complementary gate is connected clock line 332 so that switch 390 is activated to pass the signal on line 344 to inverter 364 during negative half cycles of the clock signal on line 332.

As will be understood from FIG. 2, a request received on line 66 during the presence of a BUSY signal on line 74 causes the request signal to be latched onto line 368. This latching takes place due to the high signal on BUSY line 74 in conjunction with the high signal on request line 66 resulting in a high output of AND gate 382 during a positive clock signal half cycle. The high output of AND gate 382 is returned during negative clock half cycles through switch 390 to maintain a high request signal on line 362. It will be understood that finite time is required for the output of a CMOS switch to decay when the switch is turned off. Thus, a high signal on the input of switch 390 causes a high output of switch 390 during negative half cycles and the output decays slowly during positive half cycles when switch 390 is turned off. As a consequence of this slow decay and the clock speed, whenever line 344 is high, the output of switch 390 appears to be continuously high causing the output of inverter 364 to be continuously low. This results in the output of switch 366 being continuously low to maintain a low signal at the inverting inputs of gates 370 and 382. When the BUSY signal on line 74 is deasserted, the output of gate 370 goes high asserting the signal on line 87F. At the same time, the output of gate 382 goes low causing the output of switch 390 to go low at the next negative clock cycle.

As will also be understood, a reset signal on line 340 causes line 362 to go low by turning on FET 396. This resets the signal on line 87F to a low state.

As will also be understood, an enable signal should asserted on line 336 whenever it is desired that the system respond to bus watch access request.

Returning to FIG. 1, it can be seen that more or less access blocks can be provided depending on the number of possible access requests. Also, blocks can be disabled individually if it is desired to eliminate responses to certain access requests.

With the present invention, none of the inputs to any control block needs to be latched, as was the case in the prior art. Also, the control block only waits if there is a contention in specific resource sharing. It is resource related instead of global control. The blocks can operate concurrently. Finally the present invention enables better utilization of resources. For example, if a control block wants to get data from two different shared resources and one resource is busy, access may be had to the other resource without losing time waiting for the first resource to become free.

The foregoing has been set forth to illustrate the present invention but is not deemed to limit the scope of protection being sought. It is clear the numerous addition, modifications and other changes could be made to the invention without departing from the scope of the appended claims.

What is claimed is:

1. An apparatus, comprising:
   a data processing resource to be shared;
   a plurality of users for sharing said resource; and associated with each of said users, a contention handling circuit, comprising:
   an input line for receiving an access request signal from the associated user;
   an output gate for transmitting said access request signal to said resource via a request output signal line;
   an input line for receiving a busy signal indicating that access to said resource is unavailable;
   means for disabling said output gate in response to said busy signal;
   means for latching in said request signal until said busy signal is deasserted;
   means for generating a wait output when said busy signal and said access request signal occur at the same time; and
   wherein said busy signal input to one said contention handling circuit comprises a logical sum of a wait output signal of a contention handling circuit associated with a next higher priority user and the access request signals of higher priority users.

2. An apparatus according to claim 1 wherein said latching means comprises feedback means for feeding said wait output back to said input line.

3. An apparatus according to claim 2 wherein said feedback means is responsive to a bi-phase clock to feed said wait output during one-half cycle of said bi-phase clock.

4. An apparatus according to claim 3 including a first switch in said input line for passing an access request signal, and a second switch in said feedback means, said first and second switches being activated on opposite half cycles of said bi-phase clock.

5. An apparatus for resolving contention among a plurality of users for a shared data processing resource, said apparatus comprising a plurality of access blocks with one of said access blocks being associated with each of said users, said apparatus comprising:
- an input line for receiving an access request signal from one of said associated users;
- an output gate for transmitting said access request signal to said resource via an output line;
- an input line for receiving a busy signal, said busy signal being connected to the access request signal from a higher priority user, thereby indicating that said resource is unavailable;
- means for disabling said output gate in response to said busy signal;
- means for latching in said access request signal until said busy signal is deasserted, said output gate transmitting said latched access request signal when said busy signal is deasserted;
- means for generating a wait output signal when said busy signal and said access request signal occur at the same time; and
- wherein said busy signal input to one of said access blocks comprises a logical sum of the wait output signal of an access block associated with a next higher priority user and the access request signals of all higher priority users.

6. A method for resolving contention among a plurality of users for a shared data processing resource, each of said users being associated with a respective contention handling circuit, said method being performed by one of said contention handling circuits and comprising the steps of:
- receiving an access request signal from one of said associated users on an input line;
- receiving a busy signal on an input line indicating that another access request has higher priority;
- disabling sending said access request signal from an output gate in response to said busy signal;
- latching in said access request signal until said busy signal is deasserted;
- transmitting said access request signal and said latched request signal from said output gate to said resource via an output line when said busy signal is not asserted;
- generating a wait output signal when said busy signal and said access request signal occur at the same time; and
- logically summing the wait output signal of the contention handling circuit associated with a next higher priority user and the access request signals of higher priority users to provide said busy signal input to said one contention handling circuit.

* * * * *